US007219791B2

(12) United States Patent
Shoji

(10) Patent No.: US 7,219,791 B2
(45) Date of Patent: May 22, 2007

(54) CONVEYING MECHANISM

(75) Inventor: Shigeru Shoji, Tokyo (JP)

(73) Assignee: TDK Corporation, Tokyo (JP)

( * ) Notice: Subject to any disclaimer, the term of this patent is extended or adjusted under 35 U.S.C. 154(b) by 19 days.

(21) Appl. No.: 11/290,800

(22) Filed: Dec. 1, 2005

(65) Prior Publication Data

US 2006/0127106 A1 Jun. 15, 2006

(30) Foreign Application Priority Data

Dec. 14, 2004 (JP) ............................ 2004-362043

(51) Int. Cl.
*B65G 37/00* (2006.01)

(52) U.S. Cl. ......................... 198/608; 198/620; 399/16

(58) Field of Classification Search ................ 198/604, 198/608, 620, 624, 690.1; 271/110, 193, 271/901; 399/16; 324/207.27; 226/181
See application file for complete search history.

(56) References Cited

U.S. PATENT DOCUMENTS 4,678,178 A * 7/1987 Akiyama et al. ........... 198/624
4,765,273 A * 8/1988 Anderle ...................... 198/624
4,831,416 A * 5/1989 Benson ....................... 198/624
5,350,170 A * 9/1994 Emigh et al. ............... 198/624
5,964,462 A * 10/1999 Saltsov ....................... 198/624

FOREIGN PATENT DOCUMENTS

JP A 2001-074499 3/2001
JP A 2002-206950 7/2002

* cited by examiner

*Primary Examiner*—James R. Bidwell
(74) *Attorney, Agent, or Firm*—Oliff & Berridge, PLC

(57) ABSTRACT

The present invention provides a conveying mechanism capable of accurately detecting a conveyance amount of an object to be conveyed with a simple configuration. A magnetic sensor is fixed to a casing along a locus of a contact point between a sheet and a conveying roller on the basis of a play between the conveying roller and an opening. With the configuration, the contact point and the magnetic sensor are disposed relatively close to each other. Consequently, the pure conveyance amount according to the rotation amount of a magnetic recording medium using the contact point as a reference can be detected by the magnetic sensor. Moreover, the movement amount of the contact point relative to the center axis of the opening as a reference position in association with the play can be also detected with high sensitivity. Thus, the conveyance amount of the sheet can be accurately obtained.

8 Claims, 9 Drawing Sheets

CONVEYING MECHANISM

BACKGROUND OF THE INVENTION

The present invention relates to a conveying mechanism for conveying an object to be conveyed by rotation of a conveying roller.

Generally, a conveying mechanism for conveying a sheet of paper or the like is mounted on a printer, a copying machine, and the like. In the conveying mechanism, an encoder for controlling rotating operation of a conveying roller for paper feed is provided to control a paper feed position. For example, there is an encoder constructed as follows. A disc in which a plurality of slits are formed is attached to an end of the conveying roller and transmission light leaked from the slits when the disc is irradiated with light is detected by an optical sensor or the like, thereby obtaining the rotation amount of the conveying roller. Further, another encoder is also disclosed in which a magnetic disk having a magnetic pole pattern on its surface and a magnetic drum are rotated synchronously with a conveying roller to generate a magnetic signal corresponding to the magnetic pattern and, by detecting the magnetic signal by a magneto-resistive effect (MR) element, the rotation amount of the conveying roller is obtained (refer to, for example, Japanese Patent Laid-open Nos. 2001-74499 and 2002-206950).

In recent years, the improvement of precision in controlling the paper feed position is being demanded. The improvement of precision in controlling the paper feed position is achieved by, for example, improving detection precision by increasing the size of a medium such as a disc or a magnetic drum and accurately adjusting the rotation center axis of a conveying roller so that stabler rotating operation is performed.

Recently, as a printer, a copying machine, and the like are being miniaturized, miniaturization of the encoder is in increasing demand. However, as the miniaturization progresses, the influence on the error in a conveyance amount of a paper sheet caused by a play between the conveying roller and the bearing increases. This happens because the conveyance amount is detected based on only the rotation amount of the conveying roller and the error amount of slight movement of the conveying roller based on the play is not considered. Therefore, it is sufficient to reduce the play by assembling the entire conveying mechanism with extremely high precision by using, for example, a bearing having high-precision dimensions. However, it makes the mechanism itself complicated and increases the number of parts. Consequently, it becomes disadvantageous from the cost viewpoint.

SUMMARY OF THE INVENTION

The present invention has been achieved in consideration of such problems, and an object of the invention is to provide a conveying mechanism capable of accurately detecting the conveyance amount of an object to be conveyed with a simple configuration.

A conveying mechanism of the invention has the following components (A) to (D).

(A) a first rotator that is rotatably supported by a bearing and conveys an object to be conveyed in a rotation direction by rotating around a first rotation axis.

(B) an energizing member that sandwiches the object to be conveyed in cooperation with the first rotator and energizes the first rotator so that the first rotator comes into contact with the bearing.

(C) a magnetic recording medium constructed so as to rotate coaxially and integrally with the first rotator and having a magnetic recording surface orthogonal to the first rotation axis.

(D) a magnetic sensor that is fixed to the bearing bracket so as to come into contact with the magnetic recording surface of the magnetic recording medium along a locus of the contact point between the object to be conveyed and the first rotator, drawn on the basis of a play between the first rotator and the bearing bracket in the state where the energizing member energizes the first rotator, and that detects a rotation amount of the magnetic recording medium by using magnetic information recorded on the magnetic recording surface.

In the conveying mechanism of the invention, the magnetic sensor is fixed to the bearing bracket so as to come into contact with the magnetic recording surface of the magnetic recording medium along the locus drawn by the contact point between the object to be conveyed and the first rotator on the basis of the play between the first rotator and the bearing bracket, so that the contact point and the magnetic sensor are disposed relatively close to each other. Consequently, the rotation amount of the magnetic recording medium using the contact point as a reference is detected by the magnetic sensor and, moreover, the movement amount of the contact point position relative to the bearing as a reference accompanying the play is detected by the magnetic sensor.

In the conveying mechanism of the invention, since the contact point between the object to be conveyed and the first rotator and the magnetic sensor are disposed close to each other, the rotation amount of the magnetic recording medium using the contact point as a reference can be detected with high sensitivity and, moreover, the conveyance amount of the object to be conveyed can be detected accurately. Since the magnetic sensor is fixed to the bearing bracket, the conveyance amount of the object to be conveyed also including fluctuations of the contact point position accompanying the play between the first rotator and the bearing can be detected.

DETAILED DESCRIPTION OF THE PREFERRED EMBODIMENTS

An embodiment of the invention will be described in detail hereinbelow with reference to the drawings.

The configuration of a conveying mechanism as an embodiment of the invention will be described with reference to FIGS. 1 to 4. The conveying mechanism of the embodiment is mounted on, for example, a printer, a copying machine or the like, and is to convey a sheet of paper or the like with high precision. Since a head suspension assembly and a rotation detecting mechanism having the head suspension assembly of the invention are embodied by the conveying mechanism of the embodiment, they will be also described hereinbelow.

Figure 1:
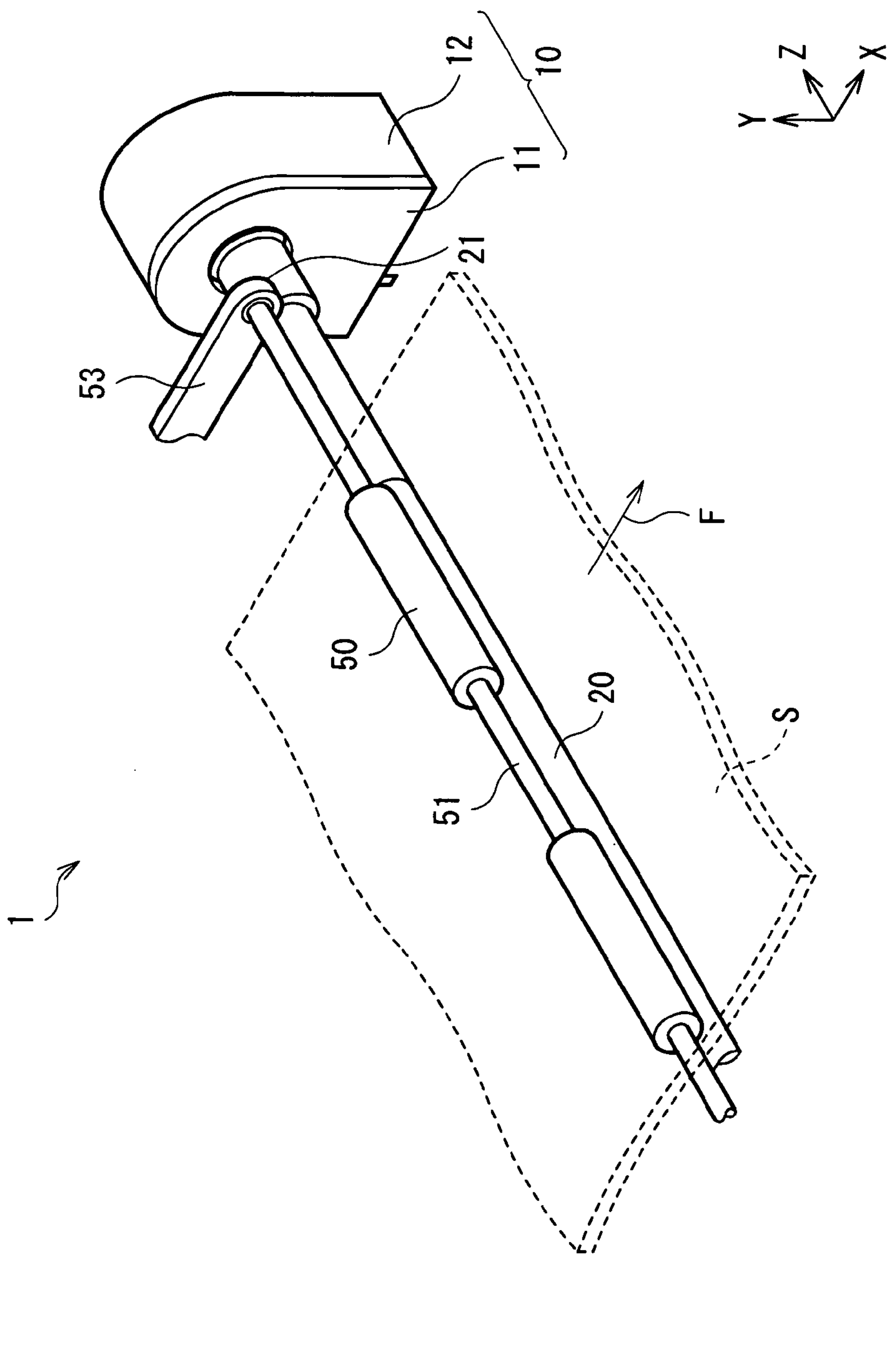
FIG. 1 is a perspective view showing an appearance configuration of a conveying mechanism according to an embodiment of the invention.
Figure 2:
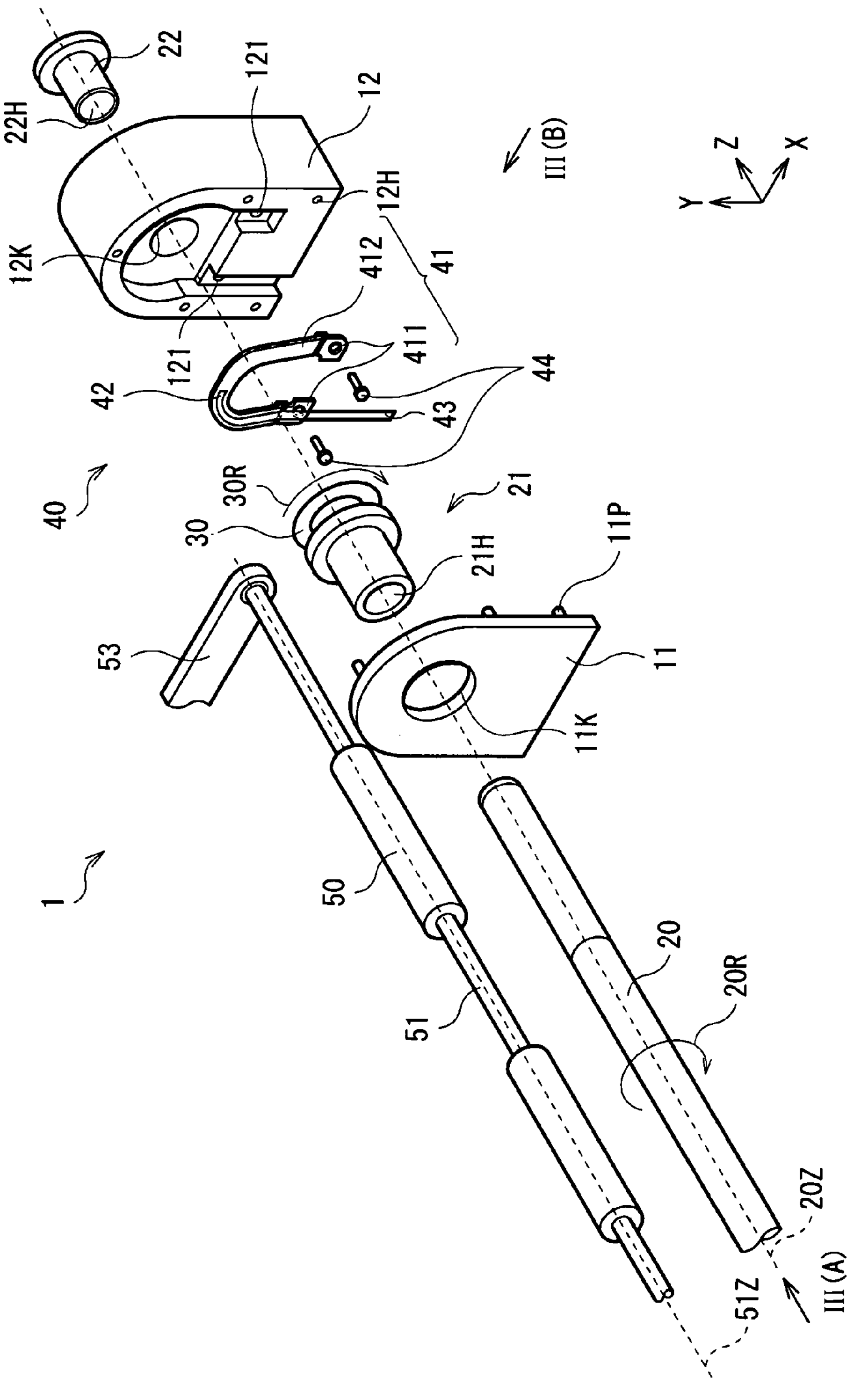
FIG. 2 is an exploded perspective view of the conveying mechanism illustrated in FIG. 1.

FIG. 1 is a perspective view showing a schematic configuration of a conveying mechanism 1 of the embodiment. FIG. 2 is an exploded perspective view corresponding to FIG. 1.

As shown in FIGS. 1 and 2, the conveying mechanism 1 of the embodiment includes: a conveying roller 20 which is rotatably supported by a bearing of a casing 10 so as to have a predetermined play and has a rotation axis 20Z extending in the Z axis direction; an annular-shaped magnetic recording medium 30 for surrounding the conveying roller 20; and a head suspension assembly 40 for detecting the rotation amount of the magnetic recording medium 30 by using magnetic information recorded on the magnetic recording medium 30. The conveying mechanism 1 further includes a presser roller 50 sandwiching a sheet S such as a paper sheet as an object to be conveyed in cooperation with the conveying roller 20. The presser roller 50 energizes the conveying roller 20 in the −Y direction so that the conveying roller 20 comes into contact with the bearing of the casing 10.

The casing 10 includes a cover 11 and a main body 12 having openings 11K and 12K functioning as bearings, respectively. The casing 10 houses the magnetic recording medium 30 and the head suspension assembly 40 by fitting a protrusion 11P of the cover 11 in a hole 12H in the main body 12, thereby displaying the function of protecting the magnetic recording medium 30 and the suspension assembly 40 from dusts.

The conveying roller 20 is to convey the sheet S in a rotation direction 20R by its rotating operation using the rotation axis 20Z as a center axis. To an end of the conveying roller 20, a base 21 and a bushing 22 are attached. By being energized by the presser roller 50, the base 21 comes into contact with the opening 11K and the bushing 22 comes into contact with the opening 12K. The end of the conveying roller 20 extends through a hole 21H in the base 21 provided between the cover 11 and the main body 12 and further inserted into a hole 22H in the bushing 22 provided on the side opposite to the base 21 so as to sandwich the main body 12. Both of the base 21 and bushing 22 rotate around the rotation axis 20Z as a center axis integrally with the conveying roller 20.

The magnetic recording medium 30 is fixed on the surface orthogonal to the rotation axis 20Z in the base 21 and rotates in a rotation direction 30R around the rotation axis 20Z integrally with the conveying roller 20. On a recording surface 31 (which will described later) orthogonal to the rotation axis 20Z, magnetic information is recorded along the circumferential direction around the rotation axis 20Z.

The head suspension assembly 40 includes a suspension 41 having a pair of attachment parts 411 and an arm 412, and a magnetic sensor 42 provided on the arm 412. In the head suspension assembly 40, the pair of attachment parts 411 is fixed to a pair of attachment parts 121 in the main body 12 of the casing 10 by screws 44. The arm 412 is a plate member made of stainless steel and having a U-shape so as to surround the periphery of the conveying roller 20 and connect the pair of attachment parts 411. The arm 412 has elasticity in a direction orthogonal to a plane including the pair of attachment parts 411 (the Z axis direction along the rotation axis 20Z) and rigidity in an in-plane direction including the pair of attachment parts 411 (the rotation direction 30R of the magnetic recording medium 30). The magnetic sensor 42 is connected to a not-shown driving circuit via a flexible printed circuit (FPC) board 43 and used at the time of executing operation of reproducing magnetic information.

Figure 3B:
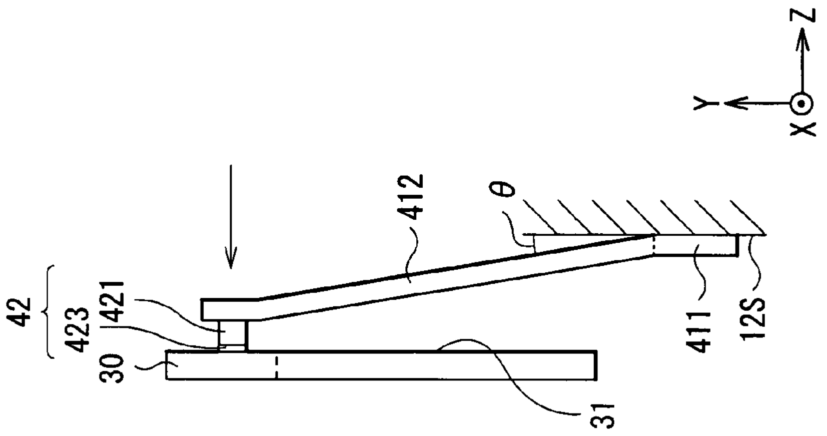
FIGS. 3A and 3B are partly enlarged views each showing the configuration of a main part of the conveying mechanism illustrated in FIG. 1.
Figure 3A:
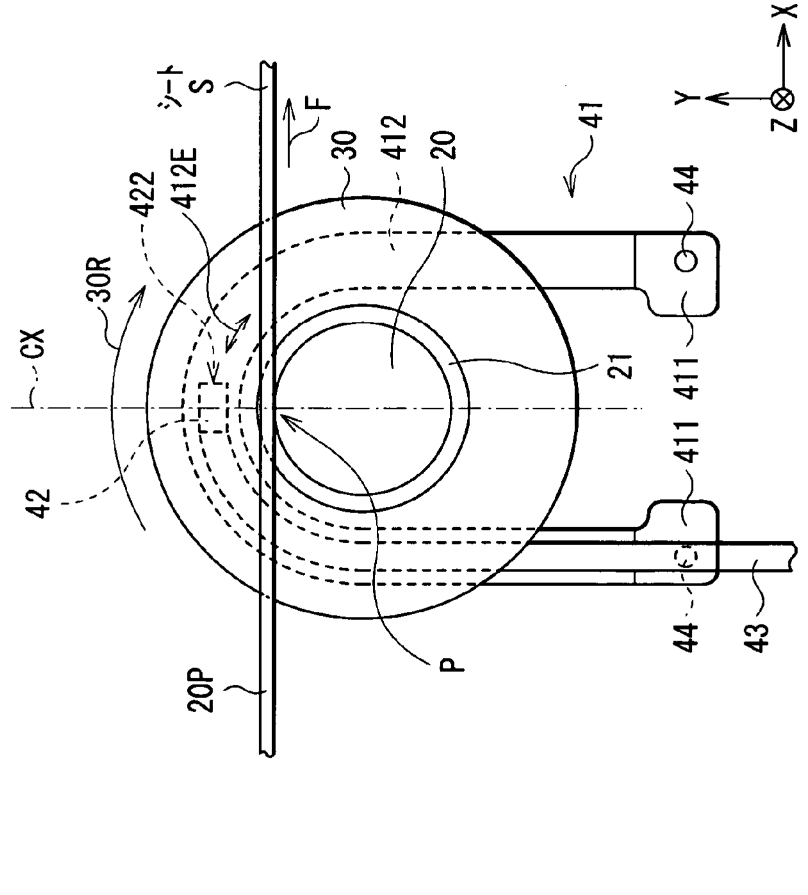
Figure 4:
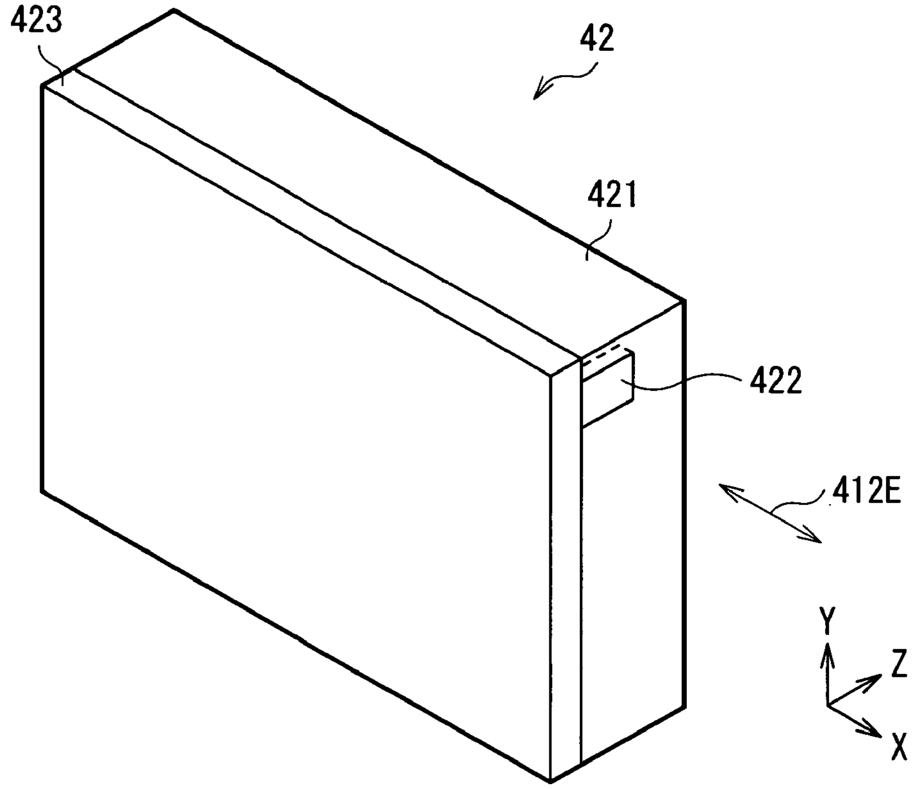
FIG. 4 is a partly enlarged view showing the configuration of another main part of the conveying mechanism illustrated in FIG. 1.

In FIGS. 3A and 3B, the magnetic recording medium 30 and the head suspension assembly 40 are enlargedly shown. FIG. 3A is a plan view seen from the direction indicated by an arrow III(A) along the rotation axis 20Z in FIG. 2. FIG. 3B is a side view seen from the direction indicated by an arrow III(B) orthogonal to the rotation axis 20Z in FIG. 2. To facilitate distinction between the magnetic recording medium 30 and head suspension assembly 40, the cover 11, base 21, and presser roller 50 are not shown in the drawings. Further, FIG. 4 shows an enlarged perspective configuration of the magnetic sensor 42. The magnetic sensor 42 is provided at an intermediate point between the pair of attachment parts 411 in the arm 412 so as to be along a contact point P between the conveying roller 20 and the sheet S. The magnetic sensor 42 includes a slider 421 having an almost rectangular parallelepiped shape and a magnetoresistive element 422 formed in one of its side faces. The magnetoresistive element 422 is a stacked body which includes a plurality of ferromagnetic layers stacked along the rotation direction 30R of the magnetic recording medium 30 (that is, an extending direction 412E of the arm 412). One end face of the magnetoresistive element 422 is covered with a protection film 423 made of diamond like carbon (DLC) or the like (refer to FIG. 4). The thickness of the protection film 423 is preferably in a range from 0.1 μm to 2.5 μm for the following reason. When the thickness of the protection film 423 is less than 0.1 μm, the protection effect in case of a damage cannot be sufficiently obtained. On the other hand, when the thickness of the protection film 423 exceeds 2.5 μm, the output of the magnetoresistive element 422 cannot be sufficiently obtained. The end face of the magnetoresistive element 422 covered with the protection film 423 is energized by elasticity of the arm 412 and is always in contact with the recording surface 31 of the magnetic recording medium 30. It is preferable to reduce the frictional force by, for example, coating the recording surface 31 with a lubricating oil. The arm 412 is tilted so as to form an angle $\theta$ with a main body surface 12S parallel to the recording surface 31 (refer: FIG. 3B). The angle $\theta$ is, for example, 1° to 20°.

The presser roller 50 is attached to a shaft 51 having a rotation axis 51Z (FIG. 2) so as to rotate around the rotation axis 51Z in accordance with an external force. The shaft 51 is rotatably supported by a support 53 as a bearing different from the casing 10.

In the conveying mechanism 1 constructed as described above, a conveyance amount Q of the sheet S is obtained by detecting the rotation amount of the conveying roller 20 by the magnetic sensor 42. The operation of conveying the sheet S in the conveying mechanism 1 is started by sandwiching the sheet S by the presser roller 50 and the conveying roller 20 and rotating the conveying roller 20 by a not-shown driving source such as a motor.

Figure 5:
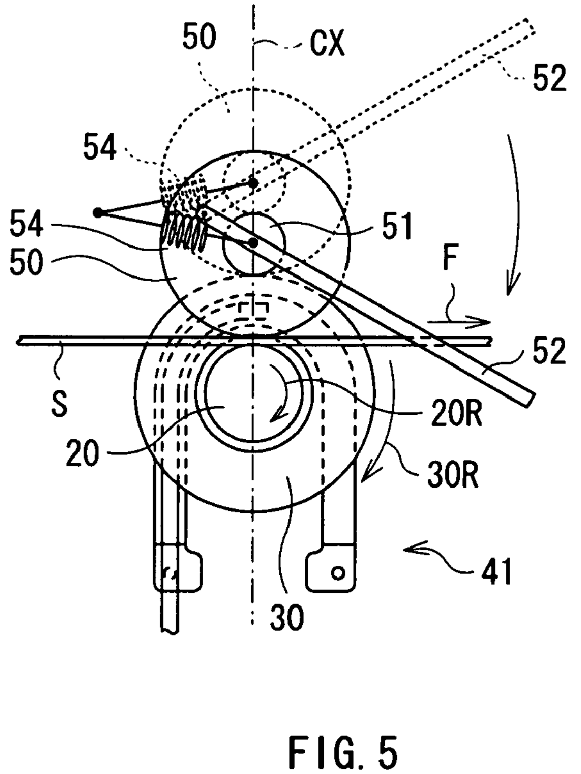
FIG. 5 is an explanatory diagram showing operation performed at the time of conveying an object to be conveyed in the conveying mechanism illustrated in FIG. 1.

Concretely, as shown in FIG. 5, an operation lever 52 coupled to the shaft 51 is tilted to the side of the conveying roller 20 and pressed to the conveying roller 20 (in the −Y direction) so as to sandwich the sheet S by the presser roller 50. In this case, the presser roller 50 and the conveying roller 20 are formed of hard rubber or the like having sufficient frictional force with the surface of the sheet S. Therefore, the sheet S is fixed if the conveying roller 20 does not rotate, so that the sheet S is not moved in a conveying direction F. After this state is set, the conveying roller 20 is rotated, for example, in the rotation direction 20R, so that the sheet S is conveyed in the conveying direction F (+X direction). By detecting the rotation amount of the conveying roller 20 by the magnetic sensor 42 using magnetic information of the magnetic recording medium 30, the conveyance amount Q can be obtained.

Figures 6A, 6B, 6C:
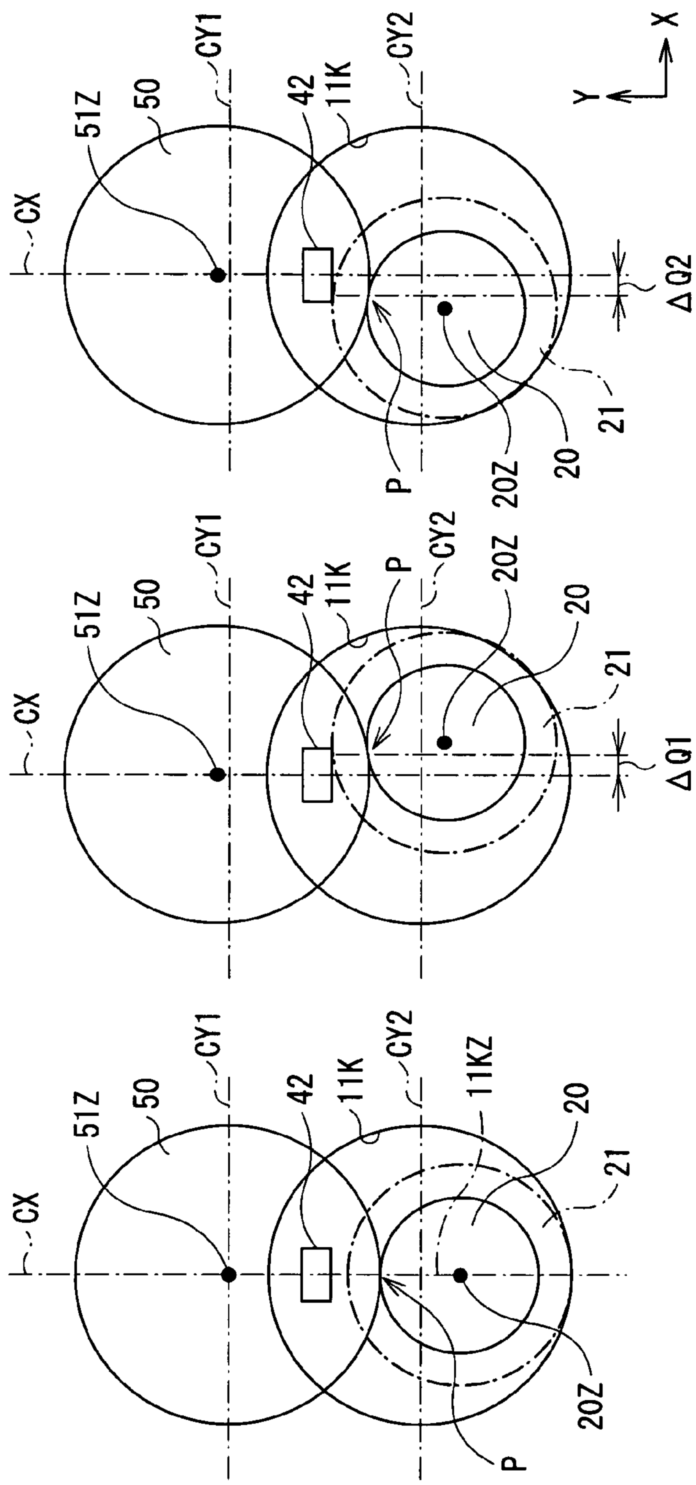
FIGS. 6A to 6C are schematic configuration diagrams showing position fluctuations of a second rotator and a bearing at the time of conveying an object to be conveyed in the conveying mechanism illustrated in FIG. 1.

However, due to the predetermined play (space) between the outer peripheral surface of the base 21 attached to the conveying roller 20 and the opening 11K, in the case where the energizing force of the presser roller 50 in the −Y direction is insufficient, the conveying roller 20 may move inside the opening 11K in the XY plane without stationarily staying at a predetermined position. With the movement, the position of the contact point P varies in the XY plane. As a result, the conveyance amount Q of the sheet S in the case of using the casing 10 as a reference varies. Hereinbelow, the embodiment will be described with reference to FIGS. 6A to 6C. Each of FIGS. 6A to 6C is a schematic cross section showing the configuration of a main part of the conveying mechanism 1. FIG. 6A shows the initial state where each of components is in a reference position. FIGS. 6B and 6C show the state where the components are deviated from the reference positions due to the movement of the conveying roller 20. In FIGS. 6A to 6C, for easier understanding, only the presser roller 50, the opening 11K, the base 21, the conveying roller 20, and the magnetic sensor 42 are shown as the components, but the sheet S and the like are not shown. In FIGS. 6A to 6C, the rotation axis 51Z of the presser roller 50 and a center axis 11KZ of the opening 11K are also shown. Further, a center line CX extending in the Y axis direction passing through the center axis 11KZ, a center line CY1 extending in the X axis direction passing through the rotation axis 51Z in the reference position, and a center line CY2 extending in the X axis direction passing through the center axis 11KZ are also shown. The position of the magnetic sensor 42 relative to the opening 11K is unchanged and always exists on the center line CX.

In the initial state shown in FIG. 6A, the presser roller 50 having the rotation axis 51Z on the center line CX energizes the conveying roller 20 in the −Y direction. Consequently, the rotation axis 20Z moves from the center axis 11KZ to a position in the −Y direction. At this time, the contact point P also exists in a reference position on the center line CX. In the embodiment, the conveying direction F of the sheet S is the +X direction, so that a component along the X axis direction of the change amount of the contact point P contributes to the conveyance amount Q.

FIG. 6B shows the state where the rotation axis 20Z of the conveying roller 20 is moved in the +X direction while the outer peripheral surface of the base 21 is being in contact with the inner peripheral surface of the opening 11K, so that the rotation axis 20Z changes also in the +Y direction. Therefore, the presser roller 50 is pushed up in the +Y direction so as to oppose the energization in the −Y direction. In this state, the contact point P is moved only by a change amount ΔQ1 (>0) in the +X direction from the reference position (the center line CX). Therefore, the sheet S is conveyed only by the change amount ΔQ1 in the conveying direction F (+X direction).

On the other hand, FIG. 6C shows a state where the rotation axis 20Z of the conveying roller 20 moves in the −X direction opposite to the state of FIG. 6B. In this case as well, the conveying roller 20 moves while the outer peripheral surface of the base 21 is being in contact with the inner peripheral surface of the opening 11K, so that the rotation axis 20Z moves also in the +Y direction. Therefore, the presser roller 50 is pushed up in the +Y direction. In this state, the contact point P moves only by a change amount ΔQ2 (>0) in the −X direction from the reference position (the center line CX). Therefore, the sheet S is moved back in the direction (−X direction) opposite to the conveying direction F only by the change amount ΔQ2.

Figure 7:
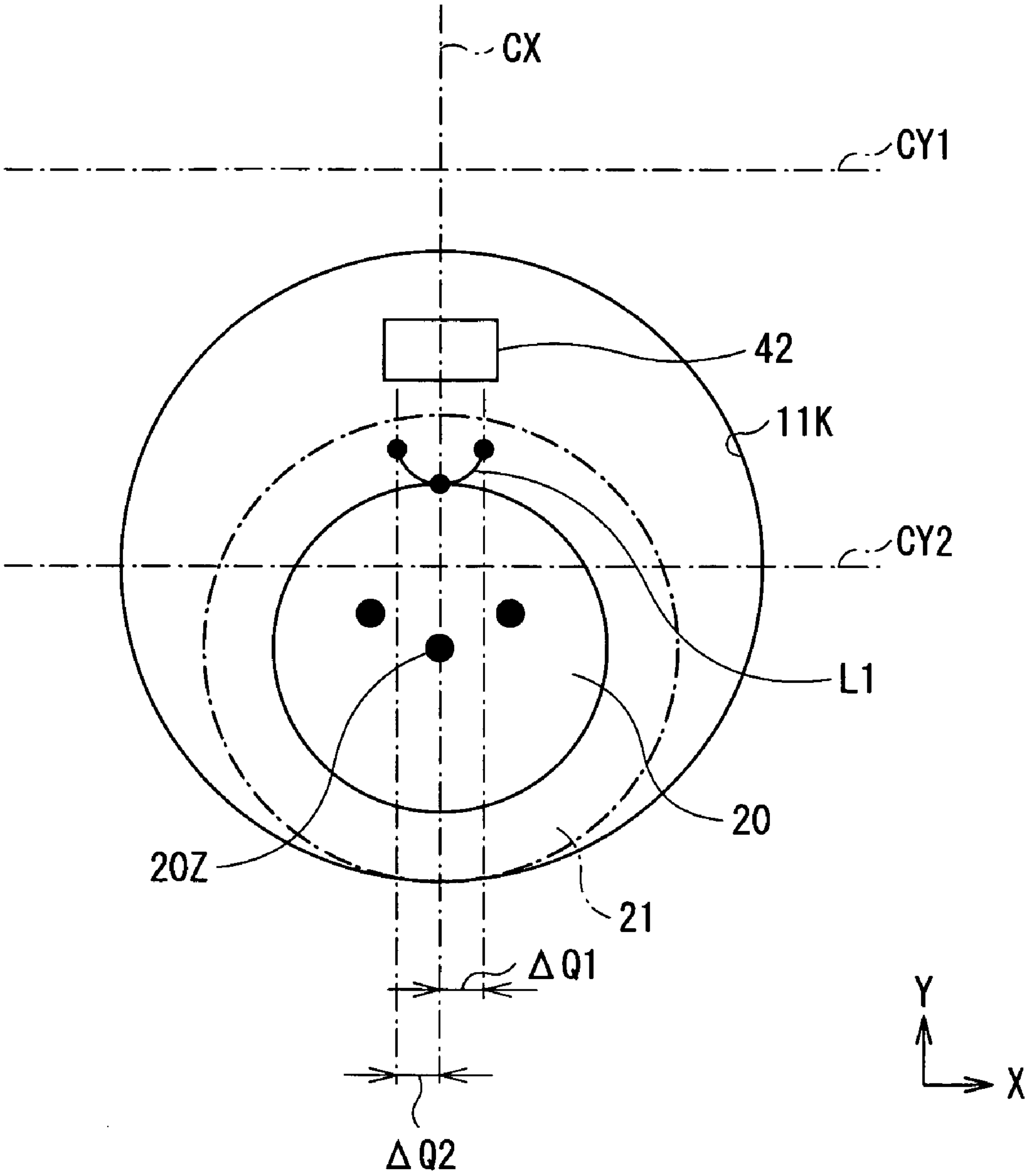
FIG. 7 is an explanatory diagram showing the locus of a contact point in correspondence with FIG. 6.

When the position of the conveying roller 20 varies in the state where the conveying roller 20 is energized by the presser roller 50 as shown in FIGS. 6A to 6C, a locus L1 drawn by the contact point P based on the play between the conveying roller 20 and the opening 11k becomes a curve as shown in FIG. 7.

Since the magnetic sensor 42 is disposed so as to be along the locus L1 of the contact point P as shown in FIG. 7 in the embodiment, the relative fluctuation between the opening 11K and (the rotation axis 20Z of) the conveying roller 20 can be grasped via the magnetic recording medium 30 which shares the rotation axis 20Z and rotates synchronously with the conveying roller 20. Consequently, the conveyance amount Q also including the fluctuation amount ΔQ of the contact point P can be detected. Concretely, in the state of FIG. 6B, the conveyance amount Q obtained by adding the change amount ΔQ1 (>0) to a pure conveyance amount Q0 of only the rotation of the conveying roller 20 (rotation of the magnetic recording medium 30) is detected. On the other hand, in the state of FIG. 6C, the conveyance amount Q obtained by subtracting only the change amount ΔQ2 (>0) from the pure conveyance amount Q0 is detected.

Figure 8C:
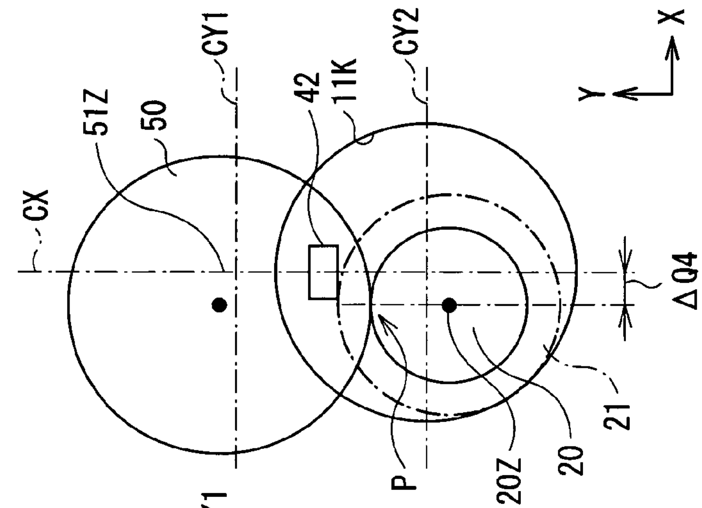
FIGS. 8A to 8C are another schematic configuration diagrams showing position fluctuations of the second rotator and the bearing at the time of conveying an object to be conveyed in the conveying mechanism illustrated in FIG. 1.
Figure 8B:
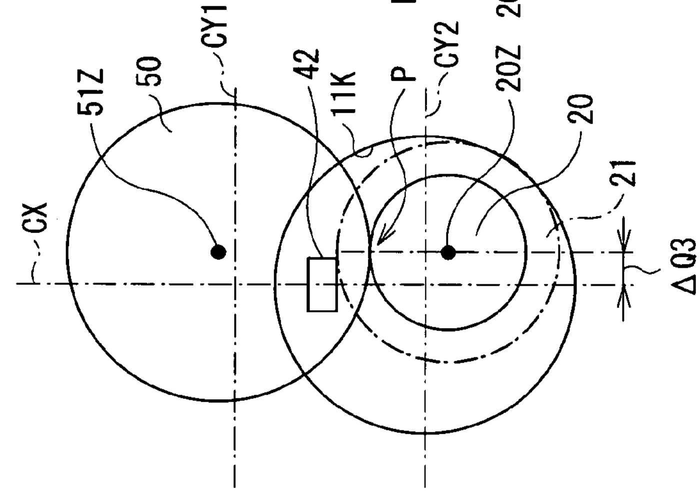
Figure 8A:
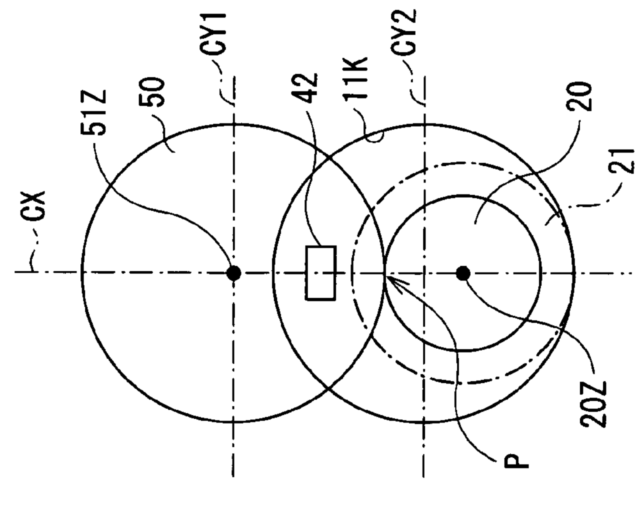

Further, in reality, the shaft 51 of the presser roller 50 also has a non-negligible play (space) with respect to the support 53 in many cases. There may be a case as shown in FIGS. 8A to 8C. FIGS. 8A to 8C are schematic cross sections each showing the configuration of a main part of the conveying mechanism 1 in a manner similar to FIGS. 6A to 6C, respectively.

Like 6A, FIG. 8A shows the initial state where the presser roller 50 having the rotation axis 51Z on the center line CX energizes the conveying roller 20 in the −Y direction. FIG. 8B shows the state where both of the rotation axes 51Z and 20Z move in the +X direction from the state of FIG. 8A. In this case, the rotation axis 51Z moves due to a play between the shaft 51 and the support 53. Similarly, the outer peripheral surface of the base 21 moves while being in contact with the inner peripheral surface of the opening 11K, so that the rotation axis 20Z shifts also in the +Y direction. Therefore, the presser roller 50 is also pushed up in the +Y direction against the energization in the −Y direction. In this state, the contact point P moves only by a change amount ΔQ3 (>0) in the +X direction from the reference position (the center line CX). On the other hand, FIG. 8C shows a state where both of the rotation axes 51Z and 20Z move in the −X direction opposite to the state of FIG. 8B. In this case as well, the outer peripheral surface of the base 21 moves while being in contact with the inner peripheral surface of the opening 11K, so that the rotation axis 20Z changes also in the +Y direction. Therefore, the presser roller 50 is pushed up in the +Y direction. In this state, the contact point P moves only by a change amount Q4 (>0) in the −X direction from the reference position (the center line CX).

Figure 9:
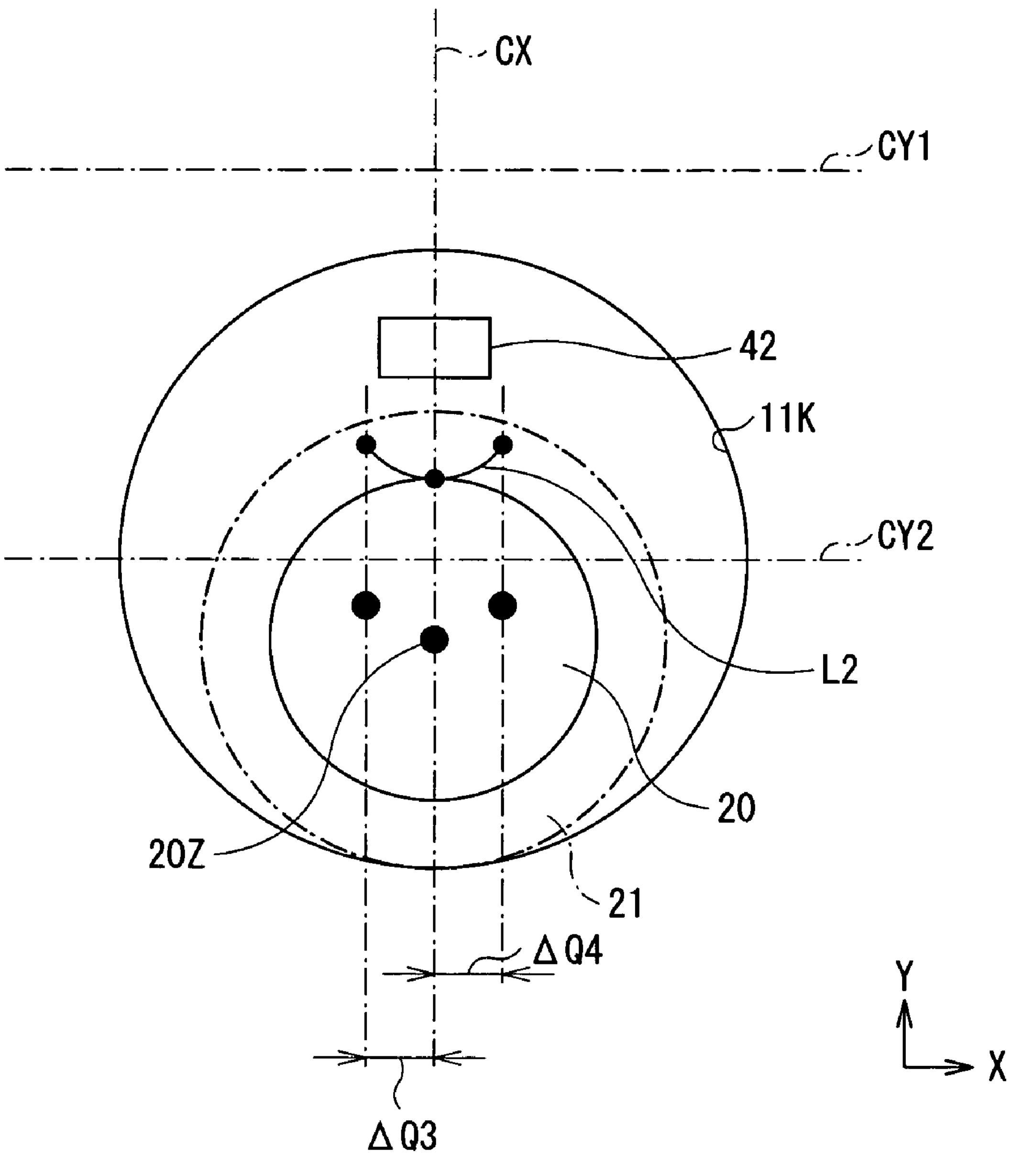
FIG. 9 is an explanatory drawing showing the locus of a contact point in correspondence with FIG. 8.

In this case (FIGS. 8A to 8C), the contact point P draws a locus L2 as shown in FIG. 9. In a manner similar to the case of FIGS. 6A to 6C, the magnetic sensor 42 is disposed so as to be along the locus L2, so that the relative fluctuation between the opening 11K and (the rotation axis 20Z of) the conveying roller 20 can be grasped via the magnetic recording medium 30. Therefore, the conveyance amount Q also including the change amount ΔQ of the contact point P can be detected. Concretely, in the state of FIG. 8B, the conveyance amount Q obtained by adding the change amount ΔQ3 (>0) to the pure conveyance amount Q0 of only the rotation of the conveying roller 20 (rotation of the magnetic recording medium 30) is detected. On the other hand, in the state of FIG. 8C, the conveyance amount Q obtained by subtracting only the change amount ΔQ4 (>0) from the pure conveyance amount Q0 is detected.

In each of FIGS. 6 and 7, the dimension of the play is exaggerated. The dimension of the play is, actually, a tiny dimension of about one fiftieth of the diameter of the opening 11K as a reference. Therefore, as described above, when the magnetic sensor 42 is disposed on the center line CX, the change amount ΔQ of the conveyance amount with fluctuation of the contact point P can be sufficiently detected.

According to the embodiment described above, the magnetic sensor 42 is fixed to the casing 10 so as to be in contact with the recording surface 31 of the magnetic recording medium 30 along the loci L1 and L2 drawn by the contact point P on the basis of the play between the conveying roller 20 and the opening 11K, so that the contact point P and the magnetic sensor 42 can be disposed relatively close to each other. Consequently, the pure conveyance amount Q0 according to the rotation amount of the magnetic recording medium 30 using the contact point P as a reference can be detected by the magnetic sensor 42 and, moreover, the movement amount of the contact point P relative to the center axis 11KZ of the opening 11K in association with the play can be also detected with high sensitivity.

In the embodiment, the head suspension assembly 40 includes the suspension 41 having the pair of attachment parts 411 and the arm 412 which extends in the U-shape so as to couple them and shows elasticity in the Z axis direction orthogonal to the plane including the pair of attachment parts 411, and the magnetic sensor 42 provided on the arm 412. Consequently, the arm 412 of the suspension 41 deflects along the Z axis direction in accordance with the magnitude of an external force pressing the magnetic sensor 42 against the recording surface 31 of the magnetic recording medium 30. Therefore, even in the case where the recording surface 31 slightly fluctuates in the Z axis direction at the time of the conveying operation, the contact state between the magnetic sensor 42 and the recording surface 31 can be continuously maintained relatively easily in a range that the arm 412 can deflect. Accordingly, magnetic information recorded on the recording surface 31 can be precisely read and the rotation amount of the conveying roller 20 (the magnetic recording medium 30) can be detected with high precision. Thus, the conveyance amount Q of the sheet S can be precisely detected.

In particular, the magnetic sensor 42 is provided at the intermediate point between the pair of the attachment parts 411 in the arm 412. Consequently, the range that the arm 412 is displaceable in the Z axis direction can be sufficiently used, so that the movable range of the magnetic sensor 42 can be assured more largely. As a result, the embodiment can sufficiently deal with a case where the position of the recording surface 31 in the Z axis direction fluctuates more largely.

In the embodiment, the presser roller 50 is further provided which sandwiches the sheet S in cooperation with the conveying roller 20 and energizes the conveying roller 20 so that the conveying roller 20 comes into contact with the support. Consequently, occurrence of idling of the conveying roller 20 and the like is prevented, and the sheet S can be conveyed more reliably.

Further, in the embodiment, the magnetic sensor 42 is attached to the arm 412 constructed so as to display rigidity in the XY plane, that is, in the plane of rotation of the magnetic recording medium 30. Therefore, without fluctuations in the position of the magnetic sensor 42 caused by friction or the like accompanying the rotation of the magnetic recording medium 30, the conveyance amount Q can be detected with higher precision.

Since the protection film 423 is provided on the side which comes into contact with the recording surface 31, of the magnetic sensor 42 in the embodiment, degradation in detection ability caused by the friction with the magnetic recording medium 30 and the like can be suppressed.

Although the invention has been described above by the embodiment, the invention is not limited to the foregoing embodiment but can be variously modified. For example, although a sheet of paper or the like is used as an object to be conveyed as an example in the embodiment, the invention is not limited to the sheet. The invention can be also applied to the case of conveying not only a plate member or a tape member made of a metal, a resin, or the like and having a predetermined length but also a liner member.

Figure 10:
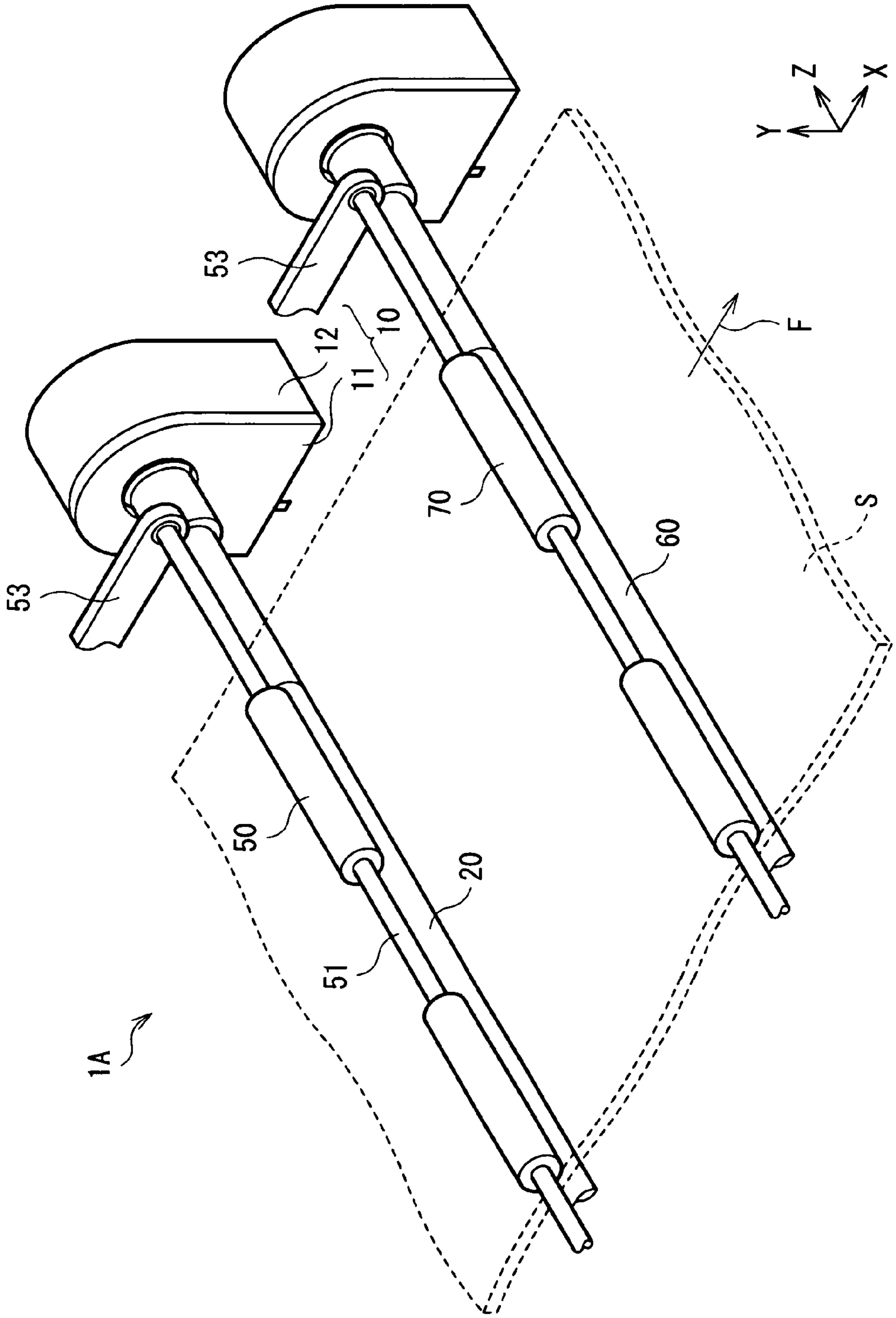
FIG. 10 is a perspective view showing an appearance configuration of a modification of the conveying mechanism according to the embodiment of the invention.

In the embodiment, the operation of conveying the sheet S is performed by rotating the conveying roller 20 by a driving source such as a motor. However, the invention is not limited to the case of driving the conveying roller 20 itself. For example, like a conveying mechanism 1A as a modification shown in FIG. 10, it is also possible to provide a driving roller 60 having a driving force and a presser roller 70 for sandwiching the sheet S in cooperation with the driving roller 60 as separate members to convey the sheet S, rotate the conveying roller 20 by using friction with the sheet S, and detect the conveyance amount Q of the sheet S. Alternately, the presser roller 50 may be driven in the conveying mechanism 1 in FIG. 1.

The applications of the conveying mechanism of the invention are not limited to a printer, a copying machine, and the like whose object to be conveyed is a paper sheet. The invention can be also applied to a printer for printing data onto various kinds of sheets and films made of a material other than paper, such as a resin.

What is claimed is:

1. A conveying mechanism comprising:

a first rotator that is rotatably supported by a bearing bracket and conveys an object to be conveyed in a rotation direction by rotating around a first rotation axis;

an energizing member that sandwiches the object to be conveyed in cooperation with the first rotator and energizes the first rotator so that the first rotator comes into contact with the bearing bracket;

a magnetic recording medium which is constructed so as to rotate coaxially and integrally with the first rotator and have a magnetic recording surface orthogonal to the first rotation axis; and a magnetic sensor that is fixed to the bearing bracket so as to come into contact with the magnetic recording surface along a locus of the contact point between the object to be conveyed and the first rotator, drawn on the basis of a play between the first rotator and the bearing bracket in the state where the energizing member energizes the first rotator, and that detects a rotation amount of the magnetic recording medium by using magnetic informations recorded on the magnetic recording surface.

2. A conveying mechanism according to claim 1, wherein the energizing member is a second rotator which rotates around a second rotation axis different from the first rotation axis and conveys the object to be conveyed in a rotation direction in cooperation with the first rotator.

3. A conveying mechanism according to claim 2, wherein either the first rotator or the second rotator rotates by its driving force.

4. A conveying mechanism according claim 1, wherein the magnetic recording medium has an annular shape.

5. A conveying mechanism according to claim 1, wherein the magnetic sensor has a magnetoresistive element constructed as a stacked body including a plurality of ferromagnetic layers stacked in the rotation direction of the magnetic recording medium.

6. A conveying mechanism according to claim 1, wherein a face which comes into contact with the recording surface of the magnetic recording medium, of the magnetic sensor is covered with a protection film.

7. A conveying mechanism according to claim 6, wherein the protection film contains diamond like carbon (DLC).

8. A conveying mechanism according to claim 6, wherein the protection film has a thickness in a range from 0.1 μm to 2.5 μm.

* * * * *